United States Patent Office 3,406,008
Patented Oct. 15, 1968

3,406,008
METHOD OF PURIFYING ALKALI METAL CHROMATE OR DICHROMATE AQUEOUS SOLUTIONS
William W. Carlin, Portland, Tex., assignor to Pittsburgh Plate Glass Company, Pittsburgh, Pa., a corporation of Pennsylvania
No Drawing. Continuation-in-part of application Ser. No. 296,452, July 22, 1963. This application May 2, 1967, Ser. No. 635,347
8 Claims. (Cl. 23—56)

ABSTRACT OF THE DISCLOSURE

Chloride, carbonate and sulfate impurities present in chromate liquors, particularly alkali metal chromate or dichromate solutions, are removed from the liquor by contact with an anion exchange resin whereby the chloride, carbonate or sulfate is selectively removed therefrom.

---

This application is a continuation-in-part of U.S. application Ser. No. 296,452, filed July 22, 1963, and now abandoned.

*Description of the invention*

This invention is directed to a method of purifying alkali metal chromate or dichromate aqueous solutions, and is particularly concerned with the removal or reduction in concentration of small amounts of anionic impurities, such as carbonate and chloride. These impurities are commonly found in various types of chromate or dichromate liquors in some small concentration. Where the dichromate is produced by reacting chromate liquor with carbon dioxide, the liquors thus become contaminated with small amounts of carbonate, probably as bicarbonate or sodium carbonate.

Sodium chromate is produced by roasting a chromite ore with sodium carbonate and dissolving out the resulting sodium chromate. Since commercial sodium carbonate always contains small amounts of chloride, this impurity is picked up by the chromate liquor. In the course of the varous processing steps used in the process, there gradually builds up in the plant solutions where these materials are produced a concentration of chloride which may ultimately become troublesome. The presence of chloride in the chromate and dichromate liquor is especially objectionable because it tends to cause or promote metal corrosion by the liquor.

In accordance with this invention, it has been found that these impurities (each of which are in the range of about 0.05 to 5 percent by weight, based upon the weight of the chromate or dichromate) can be removed from an aqueous solution of alkali metal chromate by contacting a relatively strong solution of the chromate or dichromate with an anion exchange agent, particularly anion exchange resins. Surprisingly, notwithstanding the comparatively high concentration of chromate or dichromate in these solutions, the anion exchange resin selectively removes chloride, carbonate or like anionic impurities, which do not tend to complex with chromate or dichromate. The process is conducted in a simple manner simply by passing the chromate solution through a porous bed of the anion exchange agent or by suspending particles of the anion exchange agent or resin in the solution to be treated and thereafter separating the purified solution from the agent. Solutions which contain sodium chromate and dichromate also may be purified in this way. While removal of chloride from solutions containing sodium dichromate and no sodium chromate has been achieved with a weak anion exchange agent, impurity removal has been much more effective when sodium chromate liquors have been treated.

Gradually, as the anion exchange agent continues to be used, the impurity concentration rises to a stage where the agent must be regenerated. This regeneration can be effected simply by contacting the exchange agent with a more dilute solution of alkali metal chromate. Oddly enough, in the relatively dilute solutions the anion exchange agent releases the chloride and like impurity to the solution, these ions being replaced by chromate. In this way the resin becomes regenerated to the chromate or dichromate form and is capable of further use for removal of further amounts of chloride or like impurity.

Various anion exchange agents may be used. Among the very effective agents are the strongly basic resins which contain the characteristic quaternary ammonium group

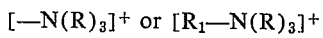

where R is an organic radical, such as ethyl, methyl, benzyl, propyl, xylyl, methylol, ethylol or the like, and $R_1$ is a divalent organic radical, such as methylene ($-CH_2-$) or the like. In addition, the more weakly basic anion exchange resins which contain the characteristic amino group

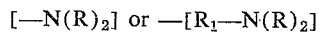

also may be used. Other anion exchange agents which contain the quaternary phosphonium groups or tertiary sulphonium groups also are capable of use in the practice of this invention.

Typical of these anion exchange resins which may be used in performance of this invention include those having the following general structure:

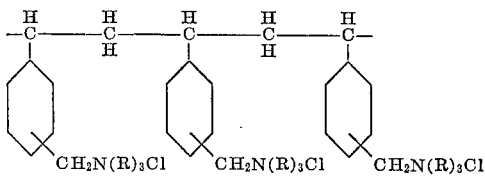

where R is methyl, ethyl, propyl, cyclohexyl, benzyl, xylyl, etc. Others have the structure:

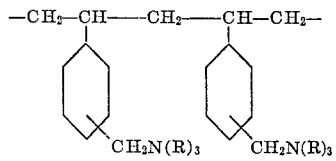

where R is as defined above.

Many of these are prepared by chloromethylating a polystyrene resin or styrene-divinyl benzene copolymer and treating the chloromethylated product with an amine, such as a dialkyl, diaryl, trialkyl or triaryl amine.

If the chlorine form of the anion exchange agent is used the inital portion of alkali metal chromate liquor passed through a bed thereof will tend to remove chloride from the resin, replacing it with chromate. However, this ultimately discontinues and thereafter further portions of liquor passed through the bed become denuded of chloride. This problem may be avoided by using the resin in a form other than the chloride. For example, if the resin is used in the chromate, dichromate or hydroxide form, removal of chloride from the chromate liquor commences immediately, with the hydroxide or chromate radical replacing the chloride in the solution. In like manner, if the resin is in the carbonate, bicarbonate, sulfate or like form, these anions replace the chloride. Thus, the particular form of the resin used is governed by the results desired, the chromate or dichromate or hydroxide form being preferred.

Sulfate and carbonate also may be removed in the same way, the usual practice in removing either of these impurities being to use a resin in a form other than the sulfate to remove sulfate and other than carbonate to remove carbonate. Thus, either of these impurities may be selectively removed from the liquor, leaving the other in the liquor, for example, by selection of the carbonate where only sulfate and chloride are to be removed, the sulfate where only chloride and carbonate are to be removed, and the chloride whereonly sulfate and carbonate are to be removed.

As previously pointed out, the chromate or dichromate solution must be relatively strong for removal of the aforesaid anionic impurity. As a general rule, it is found advantageous to treat solutions which contain in excess of 5 percent by weight of alkali metal chromate. Removal of the chloride impurity becomes more effective and more rapid as the concentration goes up. Consequently, the process is most effectively conducted by contacting the anion exchange resin with solutions containing at least 10 to 20 percent by weight of sodium chromate or like chromate up to saturated solutions.

The regeneration of the anion exchange resin to remove chloride, sulfate or carbonate from the resin is achieved conveniently by contacting the resin with a chromate which contains less than about 10 to 15 percent, preferably 5 percent or below, by weight of the chromate and, at all events, is less concentrated than the solution subjected to the treatment for removal of these ions by the resin in the chromate form. Oddly enough, the regenerating solution need not be free of anionic impurities since the chromate or dichromate selectively converts the anion exchange to the chromate or dichromate form even though the sulfate, chloride and/or carbonate or like anionic impurity may be high in concentration. Thus, at high concentrations of chromate or dichromate, the anionic impurities (particularly the divalent or monovalent anionic impurities which do not complex with chromate) are selectively absorbed by the resin and, at low concentrations of dichromate or chromate, the opposite is true.

In a typical example, an aqueous solution of sodium chromate containing about 42 percent sodium chromate, 1.2 percent chloride, and 0.02 percent sulfate, was passed through a bed 5 feet deep of a strongly basic anion exchanger manufactured under U.S. Patent No. 2,591,573, by amination with trimethylamine of a chloromethylated styrene-divinyl benzene copolymer. The temperature of the solution was 75° F. This resin is a quaternary ammonium base type of anion exchanger which contains the repeating group [—N—$(CH_3)_3$]+.

The effluent coming from the reactor had no diminished concentration of sodium chromate, but contained only 0.4 percent by weight of chloride and less than 0.01 percent of sulfate.

In other tests, it has been demonstrated that a deeper bed will completely remove the chloride. Carbonate may be removed completely in the same way.

When the resin required regeneration, it was regenerated by passing through the bed a solution containing 3 percent by weight of sodium chromate until the solution ceased to pick up substantial amounts of the adsorbed impurity (in this case, chloride).

In a series of tests, a number of commercial anion exchange resins were washed with 5 percent by weight of NaOH solution and then placed in a column ¾ inch in diameter to a bed depth of 24 inches. Four hundred (400)-milliliter samples of known chromate solutions containing 1 percent by weight NaCl based on the anhydrous basis were passed through such beds. The first 150 milliliters was discarded. The balance of the sample was collected and analyzed to determine the amount of sodium chloride removed. The results are as follows:

TABLE I

| Manufacturer | Resin identification | Percent chloride removed from solutions containing 1 percent NaCl (anhydrous basis) | | |
|---|---|---|---|---|
| | | 70 percent $Na_2Cr_2O_7 \cdot 2H_2O$ solution | $Na_2CrO_4 \cdot Na_2Cr_2O_7$ solution at pH 7 | 40 percent $Na_2CrO_4$ solution |
| Dow Chemical Co | Dowex I-X4 | | | 31.7 |
| Do | Dowex I-X8 | | | 97.0 |
| Rohm & Haas Co | Amberlite IRA-400 | 2.8 | 25.8 | 96.9 |
| Do | Amberlite IRA-401 | | | 45.9 |
| Do | Amberlite IRA-402 | | 41.4 | 99.0 |
| Dow Chemical Co | Dowex 21K | | | 35.6 |
| Rohm & Haas Co | Amberlite IRA-410 | | 10.1 | 75.5 |
| Bio-Rad Lab | Bio Rex 5 | | | 65.1 |
| Chemical Process Co | Duolite A306 | | 6.1 | 40.5 |
| Dow Chemical Co | Dowex 3-X4 | 11.2 | | |
| Rohm & Haas Co | Amberlite IR-45 | | | 40.8 |
| Chemical Process Co | Duolite A-7 | | | 23.7 |

In the above table, all percentages are by weight.

It will also be understood that the corresponding potassium chromates and dichromates may be similarly treated.

Since some of the resins which are used for this purpose are strongly basic and since dichromate is acidic, it frequently is advantageous to remove these impurities from dichromate by treating a less acidic material. Thus, mixtures of sodium chromate and dichromate which have pH values in the range of 5 to 7 or above frequently may be easier to treat than the more acidic pure dichromate solution. Thus, best results are obtained when the pH of the liquor being treated exceeds 5, although it rarely needs to be above 11 and usually does not exceed about 10.

It will also be understood that other chromate or dichromate aqueous solutions containing in excess of 5 percent, preferably not less than 10 to 15 percent of dissolved $CrO_3$ by weight of solution, may be used. Thus, aqueous chromic acid may be purified in this way.

Although the present invention has been described with reference to the specific details of certain embodiments thereof, it is not intended that such details shall be regarded as limitations upon the scope of the invention, except insofar as included in the accompanying claims.

What is claimed is:

1. A process of removing anionic impurity selected from the group consisting of carbonate, chloride and sulfate from an aqueous solution of a member of the group consisting of alkali metal chromate and alkali metal dichromate containing such impurity in an amount of from about 0.05 to about 5 percent by weight based upon the weight of chromate or dichromate in solution, which comprises contacting a solution of said member containing at least 5 percent by weight of said member with an anion exchange agent until said anionic impurity is removed.

2. A process of removing an anionic impurity selected from the group consisting of carbonate, chloride and sulfate from an aqueous solution containing in excess of 5 percent by weight of a member of the group consisting of alkali metal chromate and alkali metal dichromate containing such impurity in an amount of from about 0.05 to about 5 percent by weight based upon the weight of said member in said solution, which comprises contacting said solution with an anion exchange resin until said anionic impurity is removed, and removing from the resin the solution of said member after its content of said impurity has been reduced.

3. The process of claim 2 wherein the aqueous solution contains at least 20 percent by weight of said member.

4. The process of claim 2 wherein the member is sodium chromate and the impurity is chloride.

5. The process of claim 2 wherein the anion exchange resin is initially in the form of a member of the group consisting of chromate or hydroxide.

6. The process of claim 1 wherein the member is sodium chromate.

7. The process of claim 1 wherein the agent is in the chromate form.

8. The process of claim 1 wherein the agent is in the dichromate form.

References Cited

UNITED STATES PATENTS

| 2,559,529 | 7/1951 | Bauman | 210—37 |
| 2,789,036 | 4/1957 | Tillman | 210—37 |
| 3,234,150 | 2/1966 | Feldt et al. | 210—37 |

FOREIGN PATENTS

| 131,123 | 1/1949 | Australia. |

OTHER REFERENCES

Sussman et al. article—Industrial & Engineering Chemistry, vol. 37, No. 7, 1945 (July)—pp. 618–622 only.

Lindsay et al. article—Industrial & Engineering Chemistry, vol. 43, No. 5, May 1951—pp. 1085–1087.

OSCAR R. VERTIZ, *Primary Examiner.*

B. H. LEVENSON, *Assistant Examiner.*